United States Patent
Oesterer

(10) Patent No.: US 10,613,894 B1
(45) Date of Patent: Apr. 7, 2020

(54) STATE ANALYSIS FOR ONE OR MORE VIRTUAL MACHINES

(71) Applicant: LendingClub Corporation, San Francisco, CA (US)

(72) Inventor: Andreas Oesterer, Piedmont, CA (US)

(73) Assignee: LendingClub Corporation, San Francisco, CA (US)

( * ) Notice: Subject to any disclaimer, the term of this patent is extended or adjusted under 35 U.S.C. 154(b) by 0 days.

(21) Appl. No.: 15/998,588

(22) Filed: Aug. 15, 2018

(51) Int. Cl.
| | |
|---|---|
| *G06F 9/455* | (2018.01) |
| *G06F 9/48* | (2006.01) |
| *G06F 16/22* | (2019.01) |
| *G06N 5/04* | (2006.01) |
| *G06N 20/00* | (2019.01) |

(52) U.S. Cl.
CPC ........ *G06F 9/45558* (2013.01); *G06F 9/4843* (2013.01); *G06F 16/22* (2019.01); *G06F 2009/4557* (2013.01); *G06N 5/046* (2013.01); *G06N 20/00* (2019.01)

(58) Field of Classification Search
CPC ............. G06F 11/0778; G06F 11/3452; G06F 11/3466; G06F 11/3612; G06F 11/366
See application file for complete search history.

(56) References Cited

U.S. PATENT DOCUMENTS

| | | | |
|---|---|---|---|
| 6,671,826 B1 | 12/2003 | Joshi et al. | |
| 7,249,235 B2 | 7/2007 | Sexton et al. | |
| 2014/0310235 A1* | 10/2014 | Chan | G06F 9/4881 707/603 |
| 2016/0085656 A1* | 3/2016 | Braun | G06F 11/3476 714/38.11 |
| 2016/0085657 A1* | 3/2016 | Braun | G06F 11/36 714/38.11 |
| 2016/0323362 A1* | 11/2016 | Srinivasaiah | H04L 41/046 |
| 2017/0322861 A1* | 11/2017 | Chan | G06F 11/3612 |

* cited by examiner

*Primary Examiner* — Dong U Kim
(74) *Attorney, Agent, or Firm* — Hickman Palermo Becker Bingham LLP

(57) ABSTRACT

Techniques for state analysis for one or more virtual machines are provided herein. The techniques include receiving periodic thread dumps from each of one or more virtual machines and determining whether one or more actions should be taken based on the periodic thread dumps for at least one virtual machine of the one or more virtual machines. When it is determined that the one or more actions should be taken based on the periodic thread dumps for the at least one virtual machine of the one or more virtual machines, those the one or more actions associated with satisfying the one or more rules engines are performed. In some embodiments, the rules engines may include a trained supervised or unsupervised machine learning model.

20 Claims, 3 Drawing Sheets

STATE ANALYSIS FOR ONE OR MORE VIRTUAL MACHINES

FIELD OF THE DISCLOSURE

One technical field of the present disclosure is state analysis of computing environments, and more particularly to state analysis for one or more virtual machines.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

When any type of error or slowdown happens in a system running on one or more virtual machines, it can be very difficult, if not impossible, to find the source of the error or slowdown. For example, a deadlock may occur because of a communication issue either with one of the virtual machines or between virtual machines. One hanging application in a virtual machine can cause problems for all of the virtual machines. One slow application or set of inefficient code running on one virtual machine can cause errors to propagate to multiple aspects of a distributed system, including among one or more virtual machines. Traditionally, administrators manually look over "thread dumps" (e.g., a text-based representation of state of a virtual machine) from the one or more virtual machines in order to find errors or to debug code. This can be exceedingly cumbersome. Further, such an approach does not let the administrator look into the past and find what may have been a source of all of the slowdown or error, only allowing analysis of current state as represented by the thread dump(s).

The techniques herein overcome these issues by providing state analysis for one or more virtual machines.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As noted above, traditionally thread dumps have been analyzed on an ad hoc basis or using a computer program to analyze a single thread dump. The issues with these approaches are that 1) the analysis of a thread dump at the time of an error or slowdown will not necessarily allow the administrator to look into the past and find the underlying causes of the observed errors. An application performance monitoring tool might allow one to perform analysis based on a sample of transactions or profiling on request, but it doesn't do pattern detection on the profiling data. An application profiler might be used, but even application profilers are only used to actively troubleshoot issues for a single application, and do not profile among applications.

The techniques herein provide for state analysis of one or more virtual machines, and further provide such analysis over time, including looking at past state to help determine current issues. Generally, the techniques work by taking periodic thread dumps from one or more virtual machines that operate together. These periodic thread dumps can be analyzed in realtime in order to find symptoms that are likely to cause issues in the future, and flag those for administrators. Further, when an issue occurs, past thread dumps can be analyzed in order to determine what the underlying issue was that caused the performance failure. In some embodiments, rules for detection of issues, or even rules that detect an underlying cause of a future issue, can be generated automatically or by an administrator. The rules may be any appropriate form, such as a Boolean operations that compares data in thread dumps to preset Boolean rules. Supervised and unsupervised machine learning can also be used to analyze thread dumps.

Example Processes for State Analysis for One or More Virtual Machines

Figure 1:
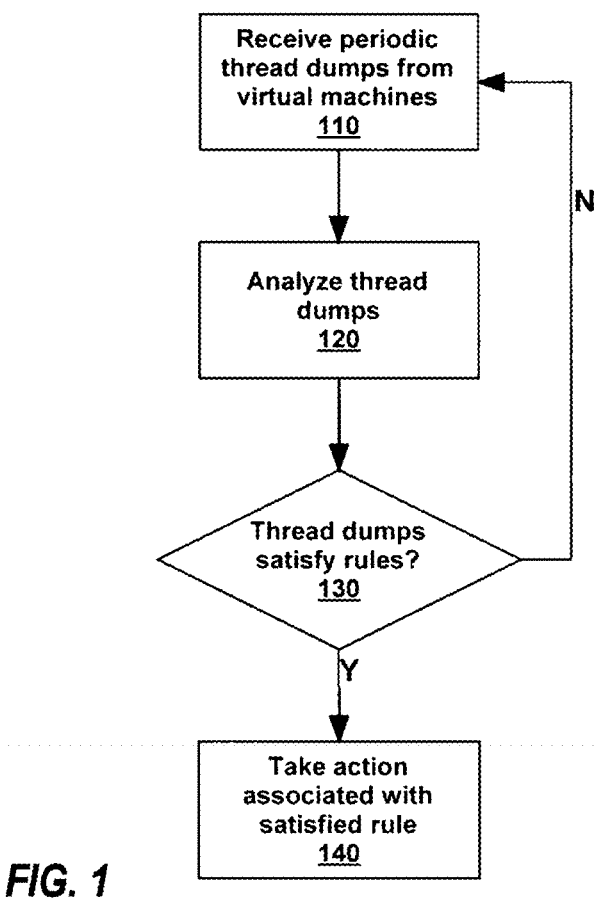
FIG. 1 is a flow diagram depicting a process for state analysis for one or more virtual machines.

FIG. 1 is a flow diagram depicting a process for state analysis for one or more virtual machines. Process 100 begins by receiving 110 periodic thread dumps from one or more virtual machines. The thread dumps from one or more virtual machines may be received at any appropriate interval such as every 100 milliseconds, 1 second, 10 seconds, 1 minute, 5 minutes, 20 minutes, 1 hour, etc. In some embodiments, thread dumps are taken on a set periodic basis and/or one or more thread dumps may also be taken upon a key event, such as a failing of a system, a bottleneck in a system, manual indication by an administrator, and the like.

The periodic thread dumps may be stored by the virtual machines into a file storage system, such as a shared drive. The shared drive may be, for example, storage 240 or 241 of FIG. 2. In some embodiments, the virtual machine will place the thread dump locally at the virtual machine, and a separate thread or process may pick up the thread dump and copy it to a central location, such as storage 240 or 241 of FIG. 2. In some embodiments, the thread dumps may be picked up by a state analysis system 230 from their place of original storage such as virtual machine 210 or storage 240 or 241, all of FIG. 2. In some embodiments, thread dumps may be streamed and/or analyzed in real time. For example, as thread dumps are received they may be processed and/or analyzed for real-time analysis.

In some embodiments, storing the periodic thread dumps from the one or more virtual machines may include storing those periodic thread dumps as entries in a state analysis database. Each entry in the database may be associated with a single thread dump. Additional information may be stored in addition to the thread dump, such as, time and date, post ID, application ID, correlation ID, and the text of the thread dump. Additional information may include when a snapshot was taken or last taken, what virtual machine or service instance is included.

In some embodiments, older thread dumps older may be purged from storage. In some embodiments, those thread dumps older than a certain age may be purged. This age at which to purge older thread dumps may vary. For example, thread dumps older than one week, one month, or one year may be purged. In some embodiments, older thread dumps are only purged based on storage availability. For example, older thread dumps will only be purged when space is needed to store newer thread dumps.

After receiving 110 periodic thread dumps from one or more virtual machines the thread dumps may be analyzed 120 to see if they any of the rules are satisfied. Analysis 120 of the thread dumps may take any appropriate form. For example, rules engines may look at one or more sets of Boolean rules. A rule may comprise logic used to determine whether more than N threads on a connection pool exist and whether two of those threads are talking on the network. Such a condition may be associated with a misconfigured HTTP connection pool. Another example rule is one in which an analysis is done in order to determine whether a particular number of threads talking to a database is greater than a particular threshold, at the same time that one or more of those threads are hung on a database connection request. Such a scenario may be associated with a hanging database or a slow database.

An example of a rules engine, written in Java, to detect block threads may include:

```
public class BlockedThreadsPatternFinder implements PatternFinder {
    private static final String[ ] EXCLUSION_LIST = {"batch"};
    static final int NUMBER_OF_BLOCKED_THREAD_THRESHOLD_PER_DUMP = 10;
    private Logger logger= LoggerFactory.getLogger(getClass( ));
    @Override
    public ThreadDumpParttern findPattern(ThreadDump dump) {
        if(dump == null || dump.getThreadinfoList( ) == null ||
dump.getThreadinfoList( ).size( ) == 0 ||
            PatternUtility.stringContainsItemFromList(dump.getHost( ),
EXCLUSION_LIST)) {
            return null;
        }
        Map<String, String> metadata=new HashMap< >( );
        AtomicInteger count = new AtomicInteger(0);
        dump.getThreadinfoList( ).forEach((t)->{
            if(t.getThreadState( ) == Thread.State.BLOCKED &&
t.isLcSpecific( )) {
                metadata.put("ThreadID=" + String.valueOf(t.getThreadId( )),
                    t.getLcRelatedStackTrace( )[0].replaceAll("^\\s+", " "));
                count.incrementAndGet( );
            }
        });
        if(count.intValue( ) >
NUMBER_OF_BLOCKED_THREAD_THRESHOLD_PER_DUMP) {
            return ThreadDumpParttern.builder( )
                .type(ThreadDumpParttern.PatternType.BLOCKED)
                .metadata(metadata)
                .threadCount(count.intValue( ))
                .build( );
        }
        return null;
    }
}
```

An example of a rules engine written in Java for deadlock detection may include:

```
public class DeadLockPatternFinder implements PatternFinder {
    private static final String[ ] EXCLUSION_LIST = {"batch"};
    @Override
    public ThreadDumpParttern findPattern(ThreadDump dump) {
        if (dump == null || dump.getThreadinfoList( ) == null || dump.
getThreadinfoList( ).size( ) == 0
            ||PatternUtility.stringContainsItemFromList(dump.getHost( ),
EXCLUSION_LIST)) {
            return null;
        }
        Map<Long, Integer> inDegree = new HashMap< >( );
        Map<Long, List<Long>> graph = new HashMap< >( );
        constructDirectedGraph(inDegree, graph, dump);
        Stack<Long> stack = new Stack<Long>( );
        for (Long key : inDegree.keySet( )){
            if(inDegree.get(key) == 0) {
                stack.push(key);
            }
        }
        while(!stack.empty( )) {
            Long cur = stack.pop( );
            for(int i = 0; i < graph.get(cur).size( ); i++) {
                long threadid = graph.get(cur).get(i);
                int curValue = inDegree.get(threadid);
                inDegree.put(graph.get(cur).get(i), curValue - 1);
                if(inDegree.get(graph.get(cur).get(i)) == 0)
                    stack.push(graph.get(cur).get(i));
            }
        }
        for (Long key : inDegree.keySet( )){
            if(inDegree.get(key) != 0) {
                Map<String, String> metadata=new HashMap< >( );
                metadata.put("ThreadID=", String.valueOf(key));
                ThreadDumpParttern result = ThreadDumpParttern
                    .builder( )
                    .type(ThreadDumpParttern.PatternType.DEADLOCK)
                    .build( );
                result.setThreadCount(1);
                result.setMetadata(metadata);
                return result;
            }
        }
        return null;
    }
    private void constructDirectedGraph(Map<Long, Integer>
inDegree, Map<Long, List<Long>> graph,
                        ThreadDump dump) {
        for (Threadinfo t : dump.getThreadinfoList( )) {
            if (t.getThreadState( ) != Thread.State.BLOCKED) {
                continue;
            }
            long childId = t.getLockInfo( ).getIdentityHashCode( );
            List<Long> waitingList;
            waitingList = graph.containsKey(t.getThreadId( )) ? graph.get(t.
getThreadId( )) : new ArrayList< >( );
            waitingList.add(childId);
            graph.put(t.getThreadId( ), waitingList);
            if (!graph.containsKey(childId))
                graph.put(childId, new ArrayList< >( ));
            if (inDegree.containsKey(childId))
                inDegree.put(childId, inDegree.get(childId) + 1);
            else {
                inDegree.put(childId, 1);
            }
            for (Long parentThreadId : t.getLockedMonitors( )) {
                if (!graph.containsKey(parentThreadId)) {
                    List<Long> parentWaitingList = new ArrayList< >( );
                    parentWaitingList.add(t.getThreadId( ));
                    graph.put(parentThreadId, parentWaitingList);
                    inDegree.put(parentThreadId, 0);
                }
                else {
                    List<Long> parentWaitingList = graph.get(parentThreadId);
                    if(!parentWaitingList.contains(t.getThreadId( ))) {
                        parentWaitingList.add(t.getThreadId( ));
                        graph.put(parentThreadId, parentWaitingList);
                    }
                }
            }
            if (inDegree.containsKey(t.getThreadId( )))
                inDegree.put(t.getThreadId( ), inDegree.get(t.getThreadId( )) +
t.getLockedMonitors( ).length);
            else
                inDegree.put(t.getThreadId( ), t.getLockedMonitors( ).length);
```

```
    }
  }
    }
```

In some embodiments, supervised learning may be used in order to generate a machine learning rules engine. Not depicted in FIG. 1, creating a supervised machine learning rules engine may include receiving two or more sets of particular thread dumps from virtual machines and an indication of whether each of those sets of thread dumps, when taken together, satisfy a particular condition. The supervised machine learning rules engine can then be trained using those sets of thread thread dumps and the related indications as the training data. Returning to FIG. 1, the supervised machine learning rules engine can then be used to analyze 120 the incoming periodic thread dumps. If the supervised machine learning rules engine indicates that the thread dumps are associated with the condition, then the action associated with the condition can be triggered. Examples of supervised machine learning algorithms that could be used include, but are not limited to, Support Vector Machines, linear regression, logistic regression, neural networks, and nearest neighbor methods.

In some embodiments, an unsupervised machine learning engine may be used to look at data in the incoming periodic thread dumps. For example, the unsupervised machine learning system may take in the thread dumps and detect when one or more of the thread dumps, individually or when taken together, are unlike previous thread dumps or sets of thread dumps. Such a satisfied condition for the unsupervised machine learning engine may result in an alert being triggered in order to get an administrator to look at the thread dumps and/or the virtual machines. In some cases, this will result in a trigger that is an anomalous but innocuous situation. In others, it may alert the administrator to an upcoming but as yet undetected issue. Examples of unsupervised machine learning algorithms that may be used include k-means clustering, mixture models, hierarchical clustering, Neural Networks, autoencoders, Deep Belief Nets, Hebbian Learning, Generative Adversarial Networks, and self-organizing maps.

In some embodiments, the analysis 120 of the thread dump includes looking at thread dumps from different time periods for the same virtual machine. For example, the thread dumps from a single virtual machine may indicate that a certain condition is met over time. Such as an increased wait time for a connection, an increased memory allocation, and the like. In some embodiments, analyzing 120 the thread dumps includes performing a query on a state analysis database to which the received 110 periodic thread dumps were stored.

In some embodiments, analysis 120 of the thread dumps includes analysis of current and/or prior thread dumps, or just current thread dumps. For example, some conditions may be satisfied by changes in the thread dumps over time. Other conditions may be satisfied by a current state of the multiple thread dumps when compared together. For example, by performing analysis 120 of the thread dumps across virtual machines belonging to the same cluster of or type of applications. As a specific example, a distributed system may have five hundred (or more) types of services, and several thousand instances of these types, some patterns become apparent by performing analysis 120 on instances or cluster of specific type.

In some embodiments, the thread dumps include correlation IDs associated with the applications and/or entities performing the actions. Further, in some embodiments, the correlation IDs are used in the analysis 120 of the thread dumps. For example, the correlation ID may be the same as one application passes off part of a transaction to another application. Using the correlation ID, the analysis 120 of thread dumps can be performed in a way that looks at the actions taken by multiple applications and/or one or more virtual machines related to a single correlation ID. As an example, a correlation ID may be used for all transaction in a multi-system operation.

After analyzing 120 the thread dumps, a determination is made whether the thread dumps satisfy 130 any rules. Determining whether a thread dump satisfied 130 any rules can include determining whether Boolean logic has been satisfied, as discussed above. Determining whether the thread dumps satisfy 130 any rules may also include determining whether a supervised machine learning or unsupervised machine learning engine has indicated an error or anomaly or that an alert should be thrown. If the thread dumps do not satisfy 130 any rules process 100 returns to receive 110 more periodic thread dumps.

If the rules are satisfied 130 then an action is taken 140, where the action is associated with the satisfied rule. The actions associated with the satisfied rules may be any appropriate action. For example, an action may include sending an alert to one or more entities if the periodic thread dumps satisfy a condition. For example, if an unsupervised machine learning engine detects that there are anomalous combinations of thread dumps an alert may be sent to one or more entities. Those entities may include operators or administrators of the virtual machines, operators or administrators of the applications running on the virtual machines, users using the applications running on the virtual machines, or any other appropriate party.

In some embodiments, if particular conditions are met then one or more processes, applications, or threads associated with the periodic thread dumps may be restarted. For example, if the analysis of the thread dumps indicate that a database may be hung, then the database which appears to be stalled may be restarted. In some embodiments, this happens without user or administrator intervention. In some embodiments, a user or an administrator may receive an alert or selectable user interface element to restart the database, optionally along with an indication of why such a restart is being suggested, such as a suspected hanging database.

In some embodiments, when the periodic thread dumps satisfy a condition one or more processes, applications, or threads may be throttled. For example, if a condition is met where it is clear that a certain application is using a large portion of a limited resource such as computing power, storage, network bandwidth, or the like, then the application that is overusing the limited resource may be throttled. Throttling may indicate that the suspected application will be lower on a priority cue for use of the limited resource. For example, the suspected application may be given fewer CPU cycles, less bandwidth, or the like. In some embodiments, when the periodic thread dumps satisfy a condition, one or more processes, applications, or threads associated with the periodic thread dumps may be terminated. For example, returning to the example above, if a suspected application is overusing limited resources, that application may be terminated. Returning to a different example above, if it appears that a database is hung, that database may be terminated, knowing that the request will go to a duplicate or backup version of the same database.

In some embodiments, taking action 140 associated with a satisfied rule can include surfacing the information on a user interface. In this way, an administrator or other operator may be able to see the triggered actions of a single or multiple thread dump analyses.

Using the techniques herein, the state of one or more virtual machines may be monitored, including past state. This enables detection of patterns in the state (e.g., represented as thread dumps) among the virtual machines, and performance of ameliorating action related to those patterns. As such, patterns may even be detected before a failure of any of the virtual machine occurs. In that case, a failure is avoided altogether thereby making the system of virtual machines perform much better. Further, the detection of patterns in the state of one or more virtual machines, and the state over time allows for more complex pattern detection that previously available, and as such can improve the system, its debugging, and the like.

System Overview

Figure 2:
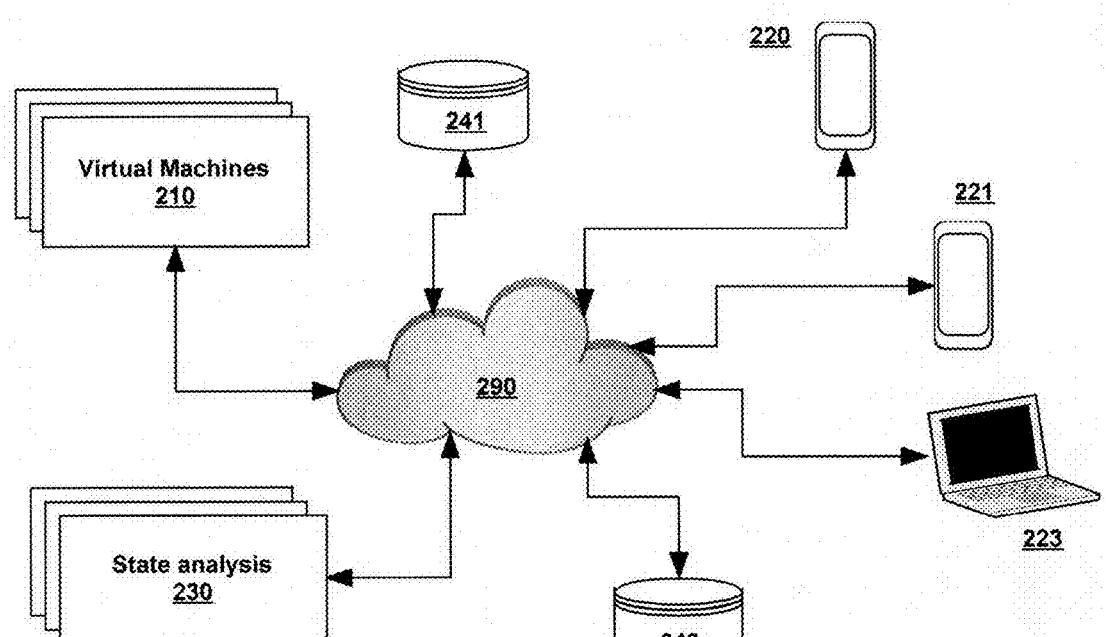
FIG. 2 is a block diagram depicting a system for state analysis for one or more virtual machines.

FIG. 2 is a block diagram depicting a system for state analysis for one or more virtual machines. Various devices 210-241 are coupled to a network 290 in the system 200. The network 290 may be an internet, intranet, private network, or any other appropriate network or combination of networks, include other networks described herein. At least one virtual machine 210 are coupled to the network 290. The virtual machines 210 may be running on the same hardware or separate hardware. Further, some virtual machines 210 may be running on one set of computing devices, while other virtual machines 210 may be running on other computing devices. All of the virtual machines 210 are couple to network 290 and may store their thread dumps locally (e.g., for later accessing by the state analysis system 230), at state analysis system 230 (for local access by the state analysis system 230), or at other storage 240 or 241. The storage 240 and 241 may be any appropriate storage, including network attached storage, a shared file system, a database, etc. The state analysis system 230 is coupled to the network 290 and may be running on the same computing devices as some or all of the virtual machines 210, or may be running on separate computing devices from any of the virtual machines 210. The state analysis system 230 may perform actions, such as those described elsewhere with respect to process 100. User devices 220-223 are also coupled to the network 290 and may be used to interact with applications running on the virtual machines and/or to receive information about conditions that have been met by the analyzed thread dumps.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
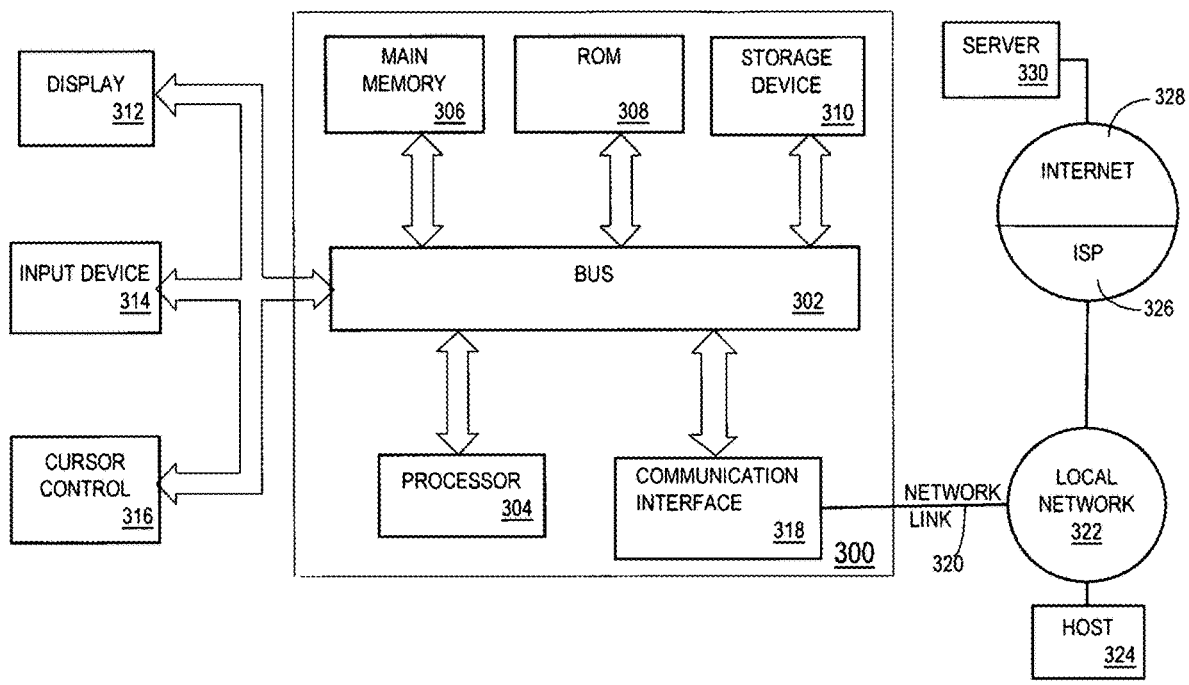
FIG. 3 depicts example hardware for state analysis for one or more virtual machines.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM, and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device.

An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:
1. A method for state analysis for one or more virtual machines, comprising:

configuring one or more rules engines to detect when any rule of a plurality of rules is satisfied;

wherein each rule of the plurality of rules is associated with a distinct set of conditions and a corresponding action;

receiving periodic thread dumps from each of one or more virtual machines;

using the one or more rules engines, determining whether the distinct set of conditions associated with any rule of the plurality of rules is satisfied based on the periodic thread dumps for at least one virtual machine of the one or more virtual machines; and in response to determining that the distinct set of conditions associated with a rule of the plurality of rules is satisfied, performing the action associated with the rule.

2. The method of claim 1, wherein the periodic thread dumps include a plurality of thread dumps, for a particular virtual machine, taken at different times.

3. The method of claim 1, wherein the periodic thread dumps include a plurality of thread dumps for two or more virtual machines.

4. The method of claim 3, wherein the periodic thread dumps include the plurality of thread dumps for two or more virtual machines, wherein each of the two or more virtual machines is running the same type of application.

5. The method of claim 3, wherein the periodic thread dumps include the plurality of thread dumps for two or more virtual machines, wherein the thread dumps share a common correlation ID.

6. The method of claim 1, further comprising:
training a supervised machine learning rules engine using, as training data, two or more particular thread dumps and an indication whether the two or more particular thread dumps satisfy a particular condition; and
using the supervised machine learning rules engine as one rules engine of the one or more rules engines.

7. The method of claim 1, further comprising:
training an unsupervised machine learning rules engine using, as training data, two or more particular thread dumps;
determining, using the unsupervised machine learning engine, that there is an anomaly in one or more particular thread dumps of the periodic thread dumps; and
flagging the one or more particular thread dumps for further review.

8. The method of claim 1, further comprising:
in response to detecting that the distinct set of conditions associated with the rule of the plurality of rules is satisfied, performing the action associated with the rule selected from a list of: sending an alert to one or more entities, restarting at least one process or thread associated with the period thread dumps, throttling at least one process or thread associated with the period thread dumps, and terminating at least one process or thread associated with the period thread dumps.

9. A method for state analysis for one or more virtual machines, comprising:
receiving periodic thread dumps from each of one or more virtual machines;
storing the periodic thread dumps from each of the one or more virtual machines as an entry in a state analysis database;
using one or more rules engines, determining whether one or more actions should be taken based on the periodic thread dumps for at least one virtual machine of the one or more virtual machines;
in response to determining that the one or more actions should be taken based on the periodic thread dumps for the at least one virtual machine of the one or more virtual machines, performing the one or more actions to be taken;
receiving a rule and generating a query to evaluate the rule; and
determining whether the periodic thread dumps for at least one virtual machine of the one or more virtual machines satisfy the rule by executing the query against the state analysis database.

10. A system for state analysis for one or more virtual machines, comprising one or more computing devices configured to perform state analysis instructions, which, when executed, perform a method of:
configuring one or more rules engines to detect when any rule of a plurality of rules is satisfied;
wherein each rule of the plurality of rules is associated with a distinct set of conditions and a corresponding action;
receiving periodic thread dumps from each of one or more virtual machines;
using the one or more rules engines, determining whether the distinct set of conditions associated with any rule of the plurality of rules is satisfied based on the periodic thread dumps for at least one virtual machine of the one or more virtual machines; and
in response to determining that the distinct set of conditions associated with a rule of the plurality of rules is satisfied, performing the action associated with the rule.

11. The system of claim 10, wherein the periodic thread dumps include a plurality of thread dumps, for a particular virtual machine, taken at different times.

12. The system of claim 10, wherein the periodic thread dumps include a plurality of thread dumps for two or more virtual machines.

13. The system of claim 12, wherein the periodic thread dumps include the plurality of thread dumps for two or more virtual machines, wherein each of the two or more virtual machines is running the same type of application.

14. The system of claim 12, wherein the periodic thread dumps include the plurality of thread dumps for two or more virtual machines, wherein the thread dumps share a common correlation ID.

15. The system of claim 10, the method further comprising:
training a supervised machine learning rules engine using, as training data, two or more particular thread dumps and an indication whether the two or more particular thread dumps satisfy a particular condition; and
using the supervised machine learning rules engine as one rules engine of the one or more rules engines.

16. The system of claim 10, the method further comprising:
training an unsupervised machine learning rules engine using, as training data, two or more particular thread dumps;
determining, using the unsupervised machine learning engine, that there is an anomaly in one or more particular thread dumps of the periodic thread dumps; and
flagging the one or more particular thread dumps for further review.

17. The system of claim 10, the method further comprising:
in response to detecting that the distinct set of conditions associated with the rule of the plurality of rules is satisfied, performing the action associated with the rule selected from a list of: sending an alert to one or more entities, restarting at least one process or thread associated with the period thread dumps, throttling at least one process or thread associated with the period thread dumps, and terminating at least one process or thread associated with the period thread dumps.

18. A system for state analysis for one or more virtual machines, comprising one or more computing devices configured to perform state analysis instructions, which, when executed, perform a method of:
  receiving periodic thread dumps from each of the one or more virtual machines;
  storing the periodic thread dumps from each of the one or more virtual machines as an entry in a state analysis database;
  using one or more rules engines, determining whether one or more actions should be taken based on the periodic thread dumps for at least one virtual machine of the one or more virtual machines;
  in response to determining that the one or more actions should be taken based on the periodic thread dumps for the at least one virtual machine of the one or more virtual machines, performing the one or more actions to be taken;
  receiving a rule and generating a query to evaluate the rule; and
  determining whether the periodic thread dumps for at least one virtual machine of the one or more virtual machines satisfy the rule by executing the query against the state analysis database.

19. One or more non-transitory storage media storing instructions which, when executed by one or more computing devices, cause performance of:
  configuring one or more rules engines to detect when any rule of a plurality of rules is satisfied;
  wherein each rule of the plurality of rules is associated with a distinct set of conditions and a corresponding action;
  receiving periodic thread dumps from each of one or more virtual machines;
  using the one or more rules engines, determining whether the distinct set of conditions associated with any rule of the plurality of rules is satisfied based on the periodic thread dumps for at least one virtual machine of the one or more virtual machines; and
  in response to determining that the distinct set of conditions associated with a rule of the plurality of rules is satisfied, performing the action associated with the rule.

20. The one or more non-transitory storage media of claim 19, further comprising:
  training a supervised machine learning rules engine using, as training data, two or more particular thread dumps and an indication whether the two or more particular thread dumps satisfy a particular condition; and
  using the supervised machine learning rules engine as one rules engine of the one or more rules engines.

* * * * *